May 30, 1972

OPTICAL BEAM DEFLECTORS 3,666,350

Filed Dec. 7, 1970

INVENTORS
E. A. OHM
D. H. RING
R. F. TRAMBARULO

BY Wilford L. Wisner
ATTORNEY

United States Patent Office 3,666,350
Patented May 30, 1972

3,666,350
MULTIPLE-SECTION, SUBDIVIDED TWO-COORDINATE OPTICAL BEAM DEFLECTORS
Edward Allen Ohm, Holmdel, Douglas Harned Ring, Middletown Township, and Ralph Francis Trambarulo, Red Bank, N.J., assignors to Bell Telephone Laboratories, Incorporated, Murray Hill, N.J.
Filed Dec. 7, 1970, Ser. No. 95,570
Int. Cl. G02f 1/20
U.S. Cl. 350—150
15 Claims

ABSTRACT OF THE DISCLOSURE

There is disclosed an apparatus for deflecting an optical beam in which electro-optic beam deflection is obtained in a multiple-section arrangement in which the deflection capability is split among several different sections which are sections of a beam waveguide, which can be made multiple-pass by end reflectors. The deflecting crystals are placed relatively near predicted beam-crossovers of the axis of the apparatus. The number of sections and their included deflecting crystals for each coordinate can be increased to a number providing either a practical length of the deflecting material with tolerable temperature rise or a reduction in the total drive power required.

BACKGROUND OF THE INVENTION

This invention relates to apparatus for deflecting optical beams.

A great variety of proposals has been made for high speed two-coordinate optical beam deflectors of high capacity. Capacity refers to the number of resolvable spots obtainable at the output, given the constraint of a desired deflection speed. It has become clear that the fastest deflectors employ electro-optic deflection in suitable crystals. Nevertheless, the combination of electro-optic deflection and high capacity has been the source of persistent problems. These problems primarily involve dissipating the heat generated within the electro-optic material by the driving (modulating) signal.

One approach to this problem has been to increase the angular deflection capability of electro-optic materials per unit of driving signal by employing multiple-pass electro-optic light deflection within a substantially confocal optical structure that resembles an optical resonator. For example, a rotary or conical scan of a coherent light beam can be readily produced in such a structure and is attractive for communication applications, such as time-division-multiplexed optical PCM communication systems. One such system employing deflectors of this rotary or conical-scan type is disclosed in U. S. Pat. No. 3,506,834 to S. J. Buchsbaum and R. Kompfner, issued April 14, 1970.

The rotary or conical-scan electro-optic beam deflector can deflect an input light beam so that the output beam will trace a set of concentric circles on a spherical surface intercepting the beam direction, provided the vertical and horizontal beam deflectors are driven at 90° relative phase shift. At somewhat different relative phase, an elliptical trace would be obtained.

In spite of the merits of such multiple-pass deflectors, the heat dissipation problems of such deflectors again reassert themselves as higher capacities and higher deflection speeds are sought. Many electro-optic materials cannot provide the capacities and speeds needed in typical practical applications without a deleterious temperature rise.

We have recognized that further improvement in solving the heat dissipation problem should and can be obtained.

SUMMARY OF THE INVENTION

According to our invention, a multiple-pass electro-optic light deflector is substantially improved with respect to heat dissipation by dividing the deflection capability among different sections of a multiple-section beam waveguide modification of the multiple-pass light deflector and dispossing the deflecting crystals relatively near beam crossover points on the axis of the beam waveguide. The number of sections and their included deflecting crystals for each coordinate can be increased to a number providing a practical total length of the deflecting material with tolerable temperature rise, even for substantially increased capacity and speed requirements. A practical length of material is that which yields the desired capacity in resolvable spots; and a tolerable temperature rise in that which produces no deleterious effects at the desired deflection speed. Also, an increase in the number of sections and deflecting crystals yields a reduction in total drive power.

Advantageously, we have also found that it is not necessary for the sections to be substantially confocal. Also, it is not necessary to provide end reflector for the beam waveguide or otherwise to provide multiple-pass operation.

BRIEF DESCRIPTION OF THE DRAWING

Further features and advantages of our invention will become apparent from the following detailed description, taken together with the drawing, in which.

DESCRIPTION OF ILLUSTRATIVE EMBODIMENTS

General description

The embodiments which follow are constructed, in part, according to principles applicable to optical beam waveguides employing a sequence of lenses. They differ from optical beam waveguides in that they employ a plurality of active deflection elements that are distributed axially along the guide.

The following principles are drawn from the beam waveguide art. When a Gaussian beam is launched in a beam waveguide, it will travel along the axis with negligible loss if the lenses are large relative to the beam diameter. However, if the beam is launched off-axis or at an angle with respect to the axis, then it will be bent toward the axis by each lens it passes. This bending will cause the beam to travel in a spiral path about the axis in general; but, if the directions of the beam and the axis lie in a plane, then the beam will follow an oscillating path above and below the axis in this plane.

To construct an embodiment of our invention in the most general case, then, one must first construct a beam waveguide. The typical and sufficient, though not necessary, condition for guiding is that the distance between focusing elements, $d$, in a beam waveguide is less than or equal to four times the focal length, $f$, for cases in which their focal lengths are equal. Thus, $$d \leq 4f \quad (1)$$

In our multiple-pass deflectors, we shall replace $d$ with $L$, the individual section length.

Having constructed a beam waveguide, one can now specify the phase and period of the oscillatory path of the beam if the input beam direction and position are specified. We wish to know these things, so that we can specify the axis crossings, at which we advantageously place our deflection elements.

The angular phase of the oscillation of the beam path about the deflector axis goes through the range $2\pi$ radians between successive upward axis crossings or between successive downward axis crossings. In this angular range there will be N lenses spaced $d$ apart. Thus, the lens spacing $d$ corresponds to $$\frac{2\pi}{N} = \theta$$

radians of the oscillation period. In beam waveguides with equal $f$ lenses and equal spacings $d$, $$\cos \theta = \left(1 - \frac{d}{2f}\right) \quad (2)$$

Since $\cos \theta$ can vary only from $-1$ to $+1$, Equation 2 is consistent with Equation 1 in that it is a necessary condition of Equation 2 that $d$ is less than or equal to $4f$.

For ease of discussion and illustration hereinafter, the angular positions will be discussed in terms of degrees along the axis from the zero phase axis crossing by the oscillatory path of the beam, instead of in terms of radians from that crossing. Thus, one oscillation of the path about the axis covers 360 degrees which can be marked off in equal increments between successive zero phase axis crossings. If the lenses are all equally spaced, and the angular position $\theta$ of the first lens is evenly divisible into 360 degrees, then there will be an integral number N of lenses traversed by the beam during each beam oscillation period. In the confocal case $\theta = 90°$ and $N = 4$.

The significance of using this number, N, of lenses for each beam period is the following. First, by definition of the period, after traveling a distance $N \times d$, the beam will have the phase $N \times \theta$ and thus will have the same deflection and direction it had at its starting point. Second, the beam displacements at the different lenses and the locations of the beam axis crossings with respect to the lenses, will repeat every N lenses. It is easiest to understand the modifications of a beam waveguide for the purposes of our invention if a beam waveguide in which N is an integer is used. Cases in which N is an integer include many non-confocal beam waveguides, e.g., $N = 3, 5, 6 \ldots$ Nevertheless, if N, that is, the ratio of 360 degrees to $\theta$, is not an integer, multiple-pass deflectors according to our invention can still be constructed by appropriately placing the reflectors so that the reflected beam must retrace the last segment of its path from the last deflection element or is directed around that element. In general, the end reflectors can be positioned to prevent continuous shifting of the beam crossover positions for each pass through the deflector.

For a stable system, the minimum value of N is 2; and in this case axis crossings at angular positions midway between the lenses are the only ones permitted. For these purposes, a curved reflector serves as a lens. For N greater than 2 and even, all axis crossings may either be located at lenses; or all may be between the lenses. For N greater than 2 and odd, crossings may either alternate between occurring at a lens and midway between lenses; or all crossings may be between lenses.

The following principles are more particular to our invention. For a multiple-pass deflector, it is desirable to place the individual deflection elements at axis crossings of the beam path. Further, while Equation 1 above is applicable only to beam waveguides in which the lens focal lengths are all equal, whether or not they are confocal, we have also found that beam waveguides suitable for our invention can be designed to have a series of lenses with differing focal lengths, including negative focal lengths. The reflecting elements should be suitably located so that the beam follows the same path on successive round trips, as will become clearer hereinafter; and the individual deflectors should still be placed at or near beam crossover points.

Further principles can be stated, at least for the case of confocal lens spacings. Two types of frequency response are possible. The first is a frequency response which we term the AC frequency and which is characteristic of systems such as those described in the above-cited patent to Buchsbaum et al.

The AC frequency response is obtained when the driving signal reverses polarity between successive passes of the beam through a deflection element to provide the cumulative deflections in all of the deflection elements for each coordinate and is suitable for carrier phase modulation of the beam. In this case set of vertical deflectors and the set of horizontal deflectors and the set of horizontal deflectors are each connected in shunt.

The second type of frequency response we term the DC frequency response. It is the type of frequency response found in FIGS. 4 and 5 of Pat. No. 3,503,671, issued Mar. 31, 1970 to R. Kompfner, and is suitable for multiple-pass baseband electro-optic phase modulation. The DC frequency response is obtained when the driving signal of each deflector does not change in phase significantly during the duration of the expected number of multiple passes of a given segment of the light beam in the deflector to provide cumulative deflections in all of the deflection elements for each coordinate. The relative connections of the respective deflection elements for this response could be termed the "series" connection. The details of these connections depend upon the particular type of deflection elements employed.

The AC frequency response has a null at zero drive frequency and has maxima at a plurality of equally spaced higher frequencies. The DC frequency response has a maximum at zero frequency and has further maxima at frequencies which are even integral multiples of the frequency at which it has its first null.

As is well-known in the art, a circular scan can be produced in any selected multi-phase system in which multiple sets of deflection elements respectively include active crystals appropriately oriented in space and appropriately driven in relative phase with respect to the crystals in the other sets, instead of the disclosed system, which includes sets of crystals oriented to provide deflections in two orthogonal coordinates and driven at 90° relative phase. The general principles described herein are typically applicable to any such multi-phase systems. It should be clear that there are many arrangements, such as those described in FIGS. 4 and 5 of the above-cited application of R. Kompfner and also those which launch the beam by oblique reflection from a small mirror, that provide a feasible single-phase system or a system with a single coordinate of scanning.

DETAILED DESCRIPTION OF ILLUSTRATIVE EMBODIMENTS

Figure 1:
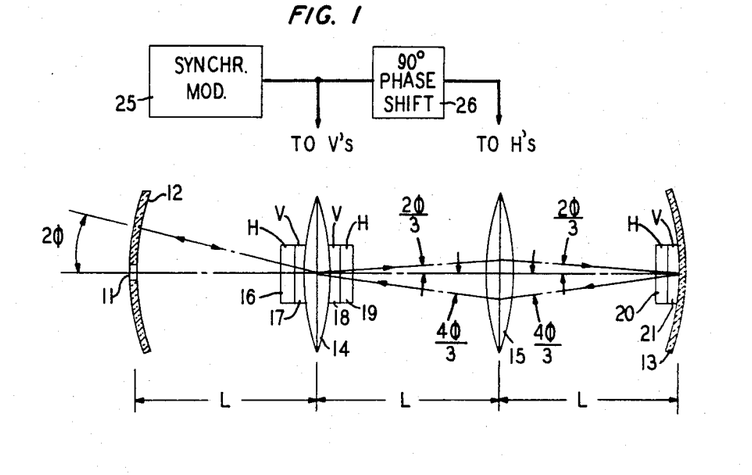
FIG. 1 is a partially pictorial and partially block diagrammatic illustration of an illustrative embodiment of our invention.

In the embodiment of FIG. 1, a coherent optical beam, typically from a laser, is introduced on the axis of the confocal beam guide with $N = 4$ and $\theta = 90°$. The input beam has a spot-size radius $W_2$ and passes through a central aperture 11 of radius $K_2W_2$ in one end mirror 12, where $K_2$ is a clearance factor. It is deflected during multiple passes between reflector 12 and the opposite end reflector 13 until it exits beyond the edge of reflector 12 at any one of a large number of positions on a circle around reflector 12. If we were to watch the output beam move in sequence through these possible positions, the beam would describe a cone when the deflector is operated in the preferred manner.

The deflection system also includes the lenses 14 and 15, illustratively all having a focal length $f=L/2$, where L is the so-called confocal spacing between the lenses 14 and 15 and between lens 14 and reflector 12 and between lens 15 and reflector 13. The beam travels through air, crystal and lenses. The electrical or optical pathlength L, taking account of the lengths and indexes of the crystals and lenses, is confocal and equal to $2f$, where $f$ is the focal length. This electrical length determines the operating frequency $\omega$. In this sense L is fixed electrically and optically, although slight differences will occur in the physical lens spacings of a real device depending on the pathlengths and $n$'s of the materials used. The focal lengths of reflectors 12 and 13 are also substantially equal to $L/2$. The angular drive frequency, $\omega$ (at the first AC response maximum) is inversely proportional to L as follows: $\omega = \pi c/2L$, where $c$ is the velocity of light. The lenses 14 and 15 have a common central transmission axis extending from the input aperture 11 of reflector 12 to the center of reflector 13.

The active electro-optic deflector elements 16, 17, 18, 19, 20 and 21 are illustratively all of the same electro-optic material, such as lithium niobate ($LiNbO_3$) or potassium dihydrogen phosphate (KDP). The deflecting elements 16–21 are distributed among the three substantially confocal cavities and are oriented and driven to provide horizontal and vertical light beam deflections of comparable magnitude with 90° relative phase shift. The deflecting elements 16–21 can be arranged in any desired sequence of horizontal and vertical deflections so long as the total horizontal and vertical deflections are nearly equal. They are all driven through suitable electrode arrangements at substantially the above-designated frequency, with the horizontal deflection stages being driven at 90° relative phase shift with respect to the vertical deflection stages for the preferred case of a conical scan. Thus, illustratively, all of the vertical deflection stages 17, 18 and 21 are driven directly from the output of the synchronous electrical modulator 25; and all of the horizontal deflection stages 16, 19 and 20 are driven from the output of the 90° phase shift circuit 26, the input of which is connected to the output of synchronous modulator 25.

The preferred specific forms of the deflecting elements 16–21 and their preferred relative orientation and electrode connections may be any of those disclosed in the copending patent applications of two of us, E. A. Ohm and R. F. Trambarulo, Ser. No. 858,708 and 858,705, both filed Sept. 17, 1969 and assigned to the assignee hereof. Nevertheless, our invention is not limited to the specific form of the individual deflecting elements and can readily incorporate improved forms of those elements.

In operation, the division of the horizontal deflecting elements into a multiplicity of parts and their distribution along the beam guide reduces the total drive power requirement for a given deflection capacity and reduces the voltage requirement for each deflecting element. Likewise, the division of the vertical deflecting elements into a multiplicity of parts and their distribution along the beam guide also serves to reduce drive power and voltage requirements, in the same fashion. Increased pathlength of active electro-optic material is also feasible in each case.

The entire deflector is enabled to exceed the capacity limitations of the simpler prior art deflectors and to provide a greater number of resolvable spots, or to provide a higher speed, given like limitations on each electro-optic deflection element with respect to heat dissipation or the total drive power consumed. The number of deflecting elements illustrated provides a more practical length of the deflecting material for each coordinate then the prior art in order to provide a desired number of output spots and the desired deflection speed. This result is achieved by increasing the number of deflecting elements of given lengths, as described above, to a number such that a specified temperature rise or a total deflection power is not exceeded, while meeting those capacity and speed objects. Alternatively, the same increase in numbers of deflecting elements can provide lower temperature rise and lower total power for prior art type capacities and speeds. The total length of the horizontal deflection material includes the combined lengths of elements 16, 19 and 20; and the total length of the vertical deflection material includes the combined lengths of elements 17, 18 and 21.

For a single confocal section, the power required for an optimum design is $$P = \frac{K_3 \omega \epsilon \lambda^3 (\tan \delta) E^2 N (K_2)^6}{n^7 (r_{63})^2} \quad (3)$$

where N is the number of resolvable spots, $K_2$ is a beam clearance factor, E is the applied driving voltage, $\lambda$ is the light wavelength, $\tan \delta$ is the loss tangent, $n$ the index of refraction, $\epsilon$ the dielectric constant and $r_{63}$ the linear electro-optic coefficient of the KDP deflector material ($r_{33}$, $LiNbO_3$), $\omega$ the driving frequency and $K_3$ is a constant including design and dimensional factors. The change in index of the electro-optic material is determined by the electric field in the material, and the power given by Equation 3 is absorbed and thus causes heating of the deflector. This heating will ultimately set a limit on the deflection magnitude or rate for any given material in the deflector.

In any case, it may be desirable to reduce the total drive power by increasing the number of sections and subdividing the deflection capability, even when satisfactory operation with sufficient power is achievable.

We note that the actual deflection obtained in each deflector is proportional to the applied voltage, while the power absorbed (Equation 3) is proportional to the voltage squared. We have devised in FIG. 1 an arrangement in which multiple deflectors of the same design can be used so that their deflection angles add linearly. Accordingly, with M identical deflectors, the total drive power required will be reduced by M and the drive power or heating per deflector will be reduced by $M_2$. Thus, two desirable results can both be achieved in this way.

A more detailed description of operation is as follows. The incoming beam reaches the deflector 17 with a spot-size radius $W_1$ and is deflected, upward in the example, by deflector 17 with an angle $\phi/3$ which is proportional to the voltage gradient in the deflector. There is no voltage and therefore no deflection in horizontal deflectors 16 and 19. After passing through the deflector 17, the beam passes through substantially the center of lens 14 and then passes through the deflector 18 where it is deflected an additional angle $\phi/3$ in the upward direction so that it emerges, after passage through deflector 19 in which voltage is zero, traveling in the direction indicated at an angle $2\phi/3$. Since it passes through lens 15 away from the center of the lens and appears to have come from a point at twice the focal length of the lens, lens 15 bends it downward at $2\phi/3$; and deflector 22 increases the deflection to $\phi$. When the beam encounters the mirror 13 it is reflected back below its arrival path. The returned beam is again deflected in three increments by an additional angle $\phi$ to accumulate the indicated upward deflection $2\phi$ in two passes through the deflector. An upward arrival is retraced upon reflection so that the reflected beam is traveling downward and is deflected downward, so that the deflections continue to accumulate. After two round trips it has a total downward deflection angle of $4\phi$ (not shown) as it travels back to the first mirror 12 a second time. The radial deflection (transverse position at incidence) of the beam when it returns to the first mirror the second time is $4\phi L$. The hole in the mirror had a radius $K_2W_2$. At its first reflection from the first mirror the beam must not strike the hole; so its radial deflection has to be at least $2K_2W_2$ to provide the same hole clearance as at entry. Similarly, for just these two passes, the mirror optical reflection aperture radius (measured from the center to the outer edge) has to be at least $3K_2W_2$ to provide a $K_2W_2$ minimum distance from the center of the beam to the edge of mirror 12. If the mirror radius is $3K_2W_2$, the beam will pass out of the cavity upon its second return to mirror 12. If the first mirror 12 radius is $K_2W_2(2n+1)$ with $n=1, 2, 3 \ldots$, the radial beam deflection at the mirror 12 increases in steps of $2\phi L$ along a radial line from the system axis as the beam is permitted to make more round trips through the cavity. This picture also establishes the minimum deflection requirement that $$2\phi L \geq K_2W_2 \qquad (4)$$

where $W_2$ is the Gaussian beam radius at the first mirror and $K_2$ is a clearance factor $>1$ to take care of device tolerances and to reduce power losses and crosstalk. This relation determines a minimum value of $\phi$ because any smaller $\phi$ would result in beam interception by the input hole on the first return to the first mirror.

The simple deflection described heretofore omits the horizontal deflection; but it is similar although it employs deflecting sections 16, 19 and 20 fed 90 degrees out of phase with sections 17, 18 and 21 to produce a circular scan of the deflected beam.

Figure 2:
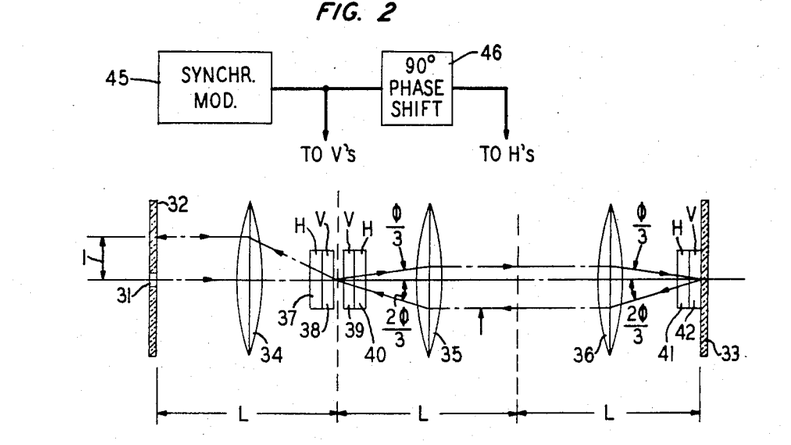
FIG. 2 is a partially pictorial and partially block diagrammatic illustration of another embodiment of the invention.

The embodiment of FIG. 2 uses components similar to those of FIG. 1, particularly the synchronous modulator 45 and phase shift circuit 46 and lenses 34 and 35, and yet another similar lens 36. The end reflectors 32 and 33 are now flat and spaced from the nearest lenses 34 and 36, respectively, by only one-half of the confocal spacing. The horizontal deflection elements 37, 40 and 41 and the vertical deflection elements 38, 39 and 42 are disposed at beam crossover regions on the central transmission axis of the lenses. It should be noted that there are no lenses at the crossover points.

The operation of the embodiment of FIG. 2 is similar to that of FIG. 1. The sense of deflection of FIG. 2 is similar to that of FIG. 1. The sense of deflection at reflector 33 is downward and at the angle $\varphi$ until deflector 22 adds the next $\varphi/3$ angular increment to the downward deflection upon the return therethrough. It will also be noted that the beam always undergoes normal incidence at reflector 32.

In summary, the deflectors of FIGS. 1 and 2 achieve a desired deflection and resolution with one-third the total drive power, and one-ninth the power dissipation per deflector unit that would be required if only a single confocal cavity and the same single horizontal and vertical deflector elements had been employed at the end of that confocal cavity opposite the input aperture, as in the above-cited patent of Buchsbaum et al.

FIG. 2 is not necessarily to scale with respect to the other figures. The relative beam widths are selectable design parameters in FIGS. 1 and 2. Feasible choices of these parameters for one cavity are illustrated in patent application Ser. No. 631,505 of one of us, E. A. Ohm, filed Apr. 17, 1967 and assigned to the assignee hereof; and similar choices can be made for the embodiment of FIG. 2.

Figure 3:
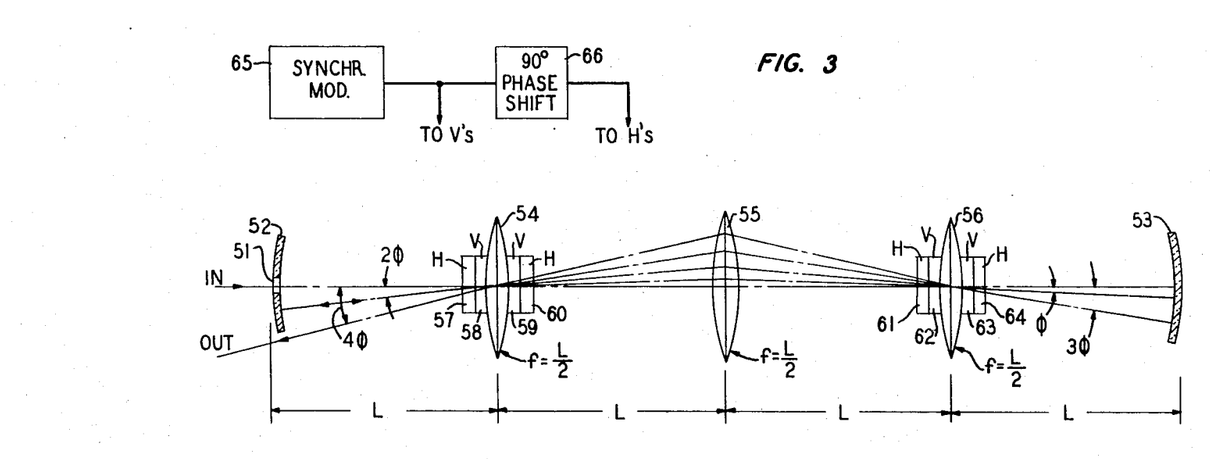
FIGS. 3 through 6 show modifications of the basic embodiments of FIGS. 1 and 2.
Figure 4:
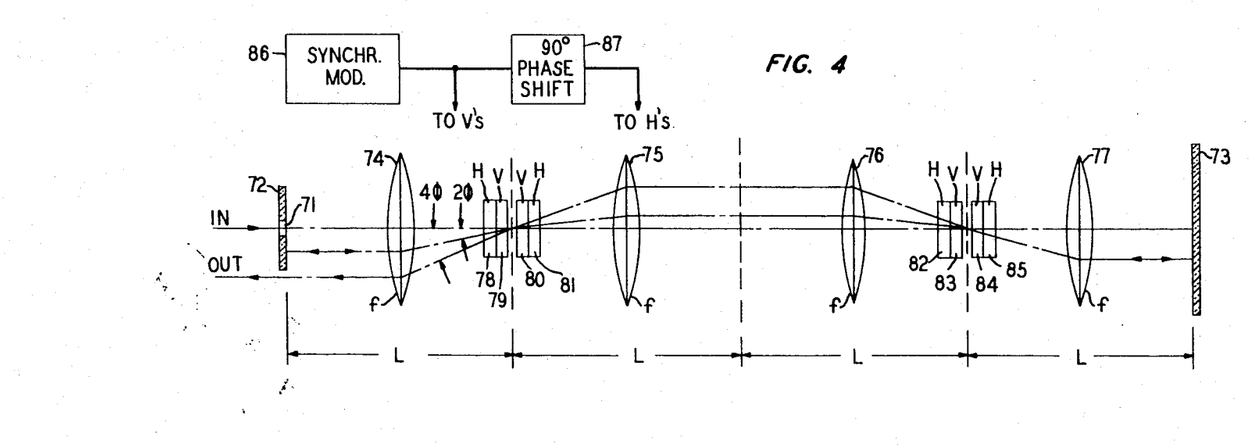
Figure 5:
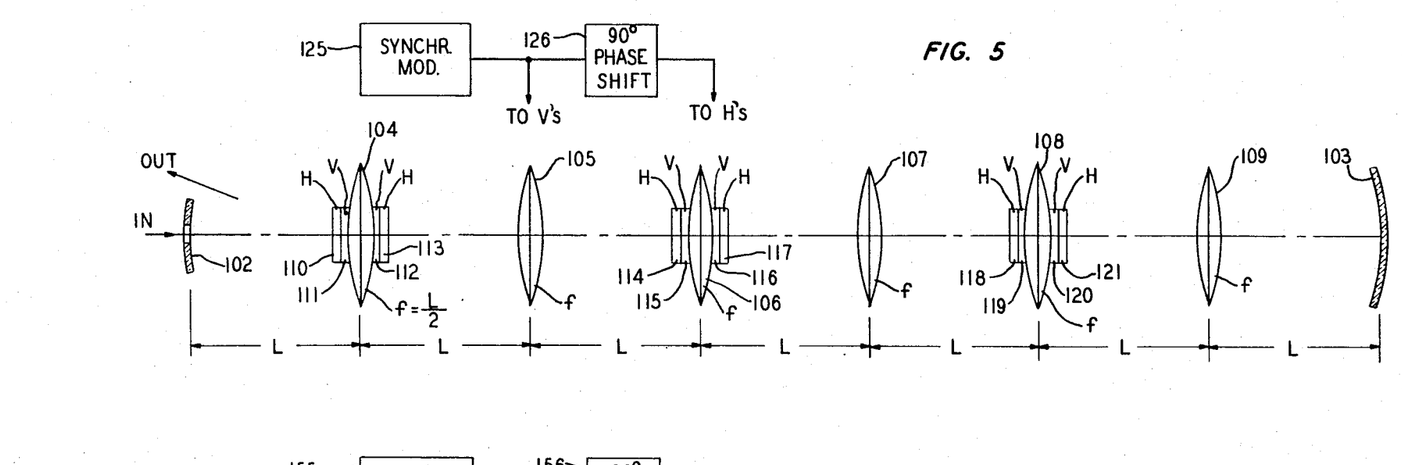
Figure 6:
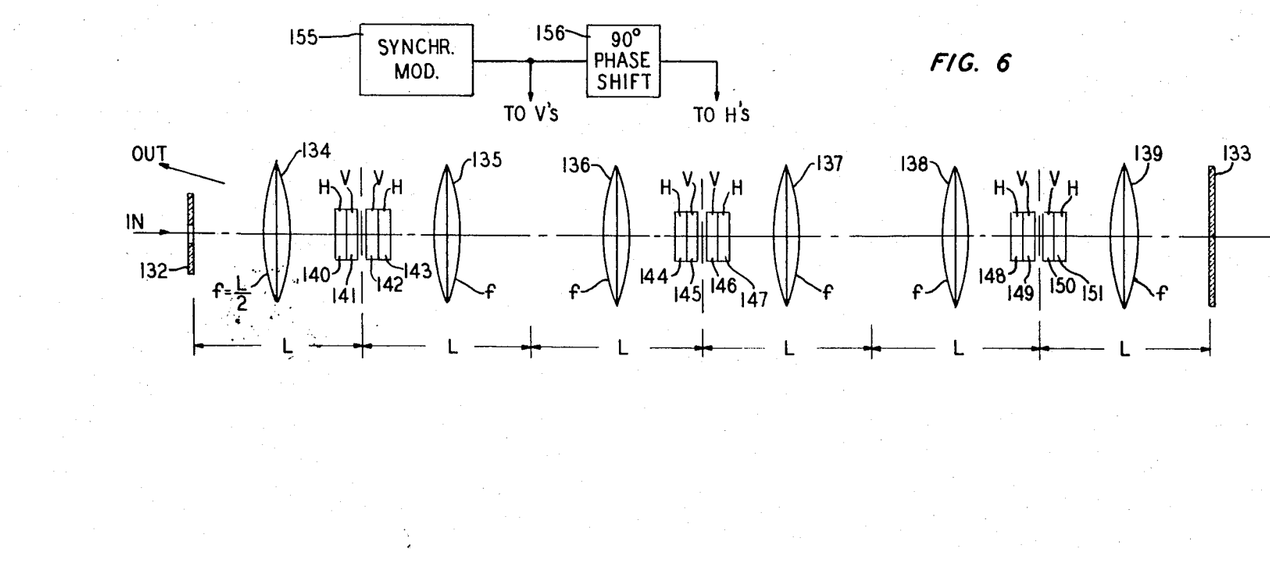

The deflectors of FIGS. 1 and 2 may be further expanded to the forms shown in FIGS. 3 and 4, respectively, and FIGS. 5 and 6, respectively, by recognizing certain basic building blocks in the deflectors of FIGS. 1 and 2. For example, the deflector of FIG. 3 can be arrived at by replacing the reflector 13 with a lens 56 with the same focal length, and adding deflector elements 63 and 64 at the right-hand side of lens 56. Reflector 53 is positioned confocally from lens 56.

These principles can be extended indefinitely, so long as the deflections occur substantially at odd confocal spacings from the input aperture.

In addition, and as a separate option, it can also be shown that a "dummy cavity section" can be created anywhere in the sequence of cavities by deleting one of more of the deflection element pairs.

Likewise, the defletcor of FIG. 4 can be arrived at from the deflector of FIG. 2 by adding deflection elements 84 and 85 adjacent to elements 82 and 83 (similar to 41 and 42) and inserting a confocally spaced lens 77 at a half-confocal spacing from deflection elements 84 and 85 and positioning reflector 73 to be a half-confocal spacing to the right of the lens 77.

In the operation of the embodiment of FIG. 4, the beam now always experiences normal incidence at reflector 73. Deflection downward on one pass through deflection element 84 becomes deflection upward on the return pass and is increased. Otherwise, operation remains similar to that of FIG. 2.

It should be noted that the vertical and horizontal deflection capabilities can be divided up among the cavities in any of the embodiments in any desired manner, as long as total length of vertical deflection elements is nearly equal to total length of horizontal deflection elements.

Still another variation of horizontal and vertical deflection capability is shown in the arrangement of FIG. 5, which is a modification of FIG. 3. It is arrived at by splitting the deflector of FIG. 3 at lens 55 (replaced by 105 and 107) and inserting lens 106 and deflection elements 114–117 according to the pre-existing principles of spacing, as shown. It wil be noted, however, that the distribution of deflection capabilities still remains a certain symmetry in that the lenses are all alike, the deflections occur at odd confocal spacings from the input apertures and the heat dissipation requirements are distributed in a reasonably uniform manner. "Dummy" confocal sections can also be added, as shown on the right-hand end of FIG. 5, with lens 109 and reflector 103 spaced as shown.

Further, in FIG. 6, the deflector of FIG. 4 is split between lenses 75 and 76 (replaced by lenses 135 and 138); and lenses 136 and 137 and deflection elements 144–147 are added.

Figure 7:
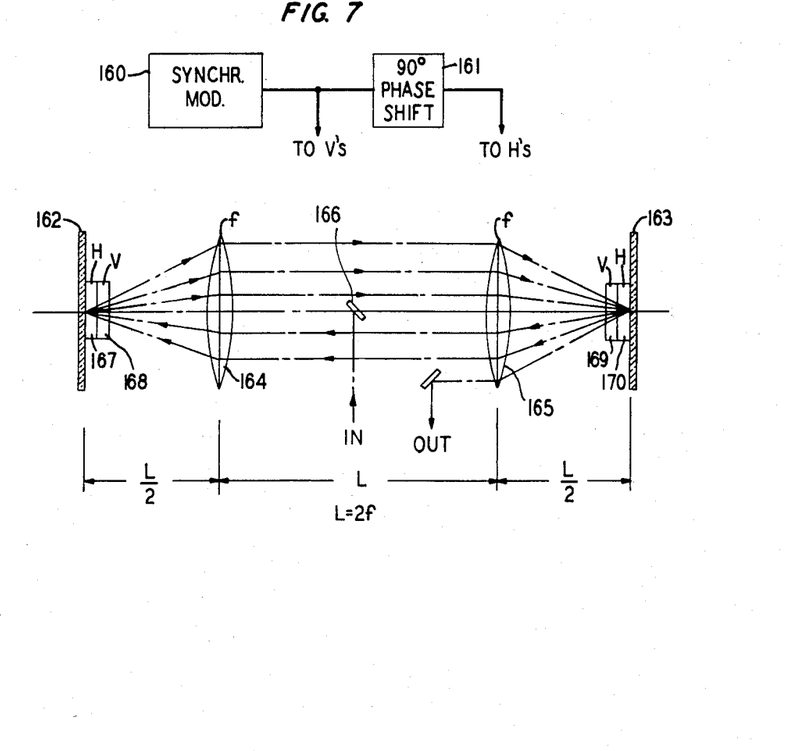
FIG. 7 is a partially pictorial and partially block diagrammatic illustration of an embodiment selected from a group of possible embodiments having a significant DC response and potential usefulness for electro-optic modulation.

A very simple multiple-pass, multiple deflector electro-optic deflector having DC frequency response and not requiring an apertured mirror is shown in FIG. 7. Reflectors 162 and 163 are flat and continuous (i.e., having no central hole) and are disposed normal to the axis extending between them through the centers of lenses 164 and 165. The input beam is introduced on the axis by the relatively small angularly disposed flat reflector 166. The deflector 166 may be disposed anywhere between the pairs of deflection elements, which include 167 and 168 at reflector 162, and 169 and 170 at reflector 163. Reflector 166 must be small enough not to intercept the beam in any of its deflected paths. The preferred placement of reflector 166 is wherever the spot sizes of the beam are small and the beams do not overlap. One such placement of reflector 166 would be at the center of FIG. 7.

Deflection elements 167 and 170 may be horizontal deflection elements and elements 168 and 169 may be vertical deflection elements. As before, the total effective lengths of vertical deflection material and horizontal deflection material are equal.

In operation, the indicated beam paths are for confocal spacing of the elements, that is, the separation of reflector 162 and lens 164 is equal to the focal length of lens 164; the separation of reflector 163 and lens 165 is equal to the focal length of lens 165; and the separation lenses 164 and 165 is equal to the sum of their focal lengths. The details of operation are similar to those of the above-described embodiments of FIGS. 2, 4 and 6 except that the beam will finally escape from the deflector beyond the edge of one of the lenses 164 and 165, as indicated. FIG. 7 may be extended by adding as many sections (one deflector and two lenses) as desired.

Figure 9:
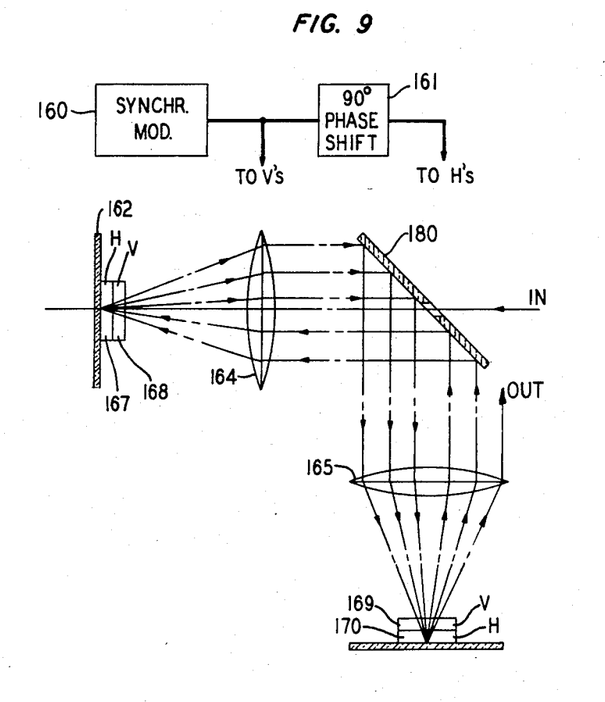
FIG. 9 shows a mechanically advantageous modification of the embodiment of FIG. 7.

A modification of the embodiment of FIG. 7 is shown in FIG. 9. Small reflector 166 is replaced with a relatively large oblique reflector 180, which has a central input aperture through which the beam is launched. The effect of this modification is to bend the apparatus into two legs at 90 degress with respect to each other. The functions of reflector 180 are in general the inverse of the functions of reflector 166 in FIG. 7. The deflected beam eventually escapes the apparatus beyond the edge of lens 165 as shown. Otherwise, the operation of the embodiment of FIG. 9 is very similar to that of FIG. 7. Nevertheless, the embodiment of FIG. 9 may have some mechanical fabrication and other practical advantage over that of FIG. 7.

Figure 8:
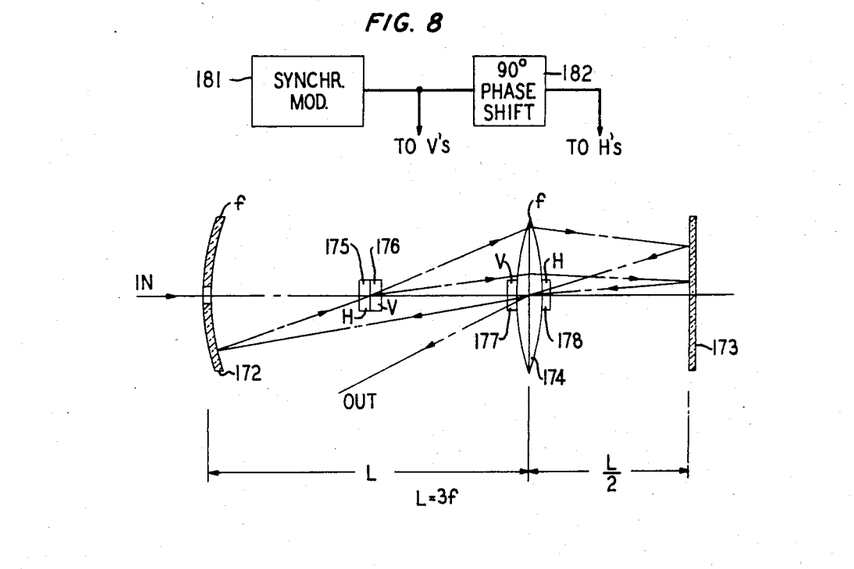
FIG. 8 is a partially pictorial and partially block diagrammatic illustration of an embodiment selected from a group of possible embodiments employing non-confocal beam waveguides.

A non-confocal embodiment is illustrated in FIG. 8 which is based on a beam waveguide with $N=3$, $\theta=120$ degrees. While some non-confocal embodiments typically would use a small oblique reflector like that in FIG. 7 for launching the input beam, the embodiment of FIG. 8 is a non-confocal embodiment that employs a central input aperture in one reflector, namely, reflector 172. Lens 174 has a focal length equal to the focal length of reflector 172 and is separated therefrom by three times that focal length. The other end reflector 173 is flat and is separated from lens 174 by 1.5 times the focal length of lens 174. One pair of deflection elements 175 and 176, horizontal and vertical, respectively, are positioned midway between reflector 172 and lens 174 at the predicted axis crossover for the beam. The other pair of deflection elements 177 and 178, vertical and horizontal, respectively, are disposed next to lens 174 on opposite sides thereof near the crossover point which occurs in the center of lens 174.

The operation of this embodiment differs from that of all of the foregoing embodiments in that the beam is routed around deflection elements 177 and 178 on the left-to-right passes through the deflector and passes through those elements only when traveling in the opposite direction.

The deflected beam may exit from the deflector either by passing beyond the edge of reflectors 172 or 173 or by passing beyond the edge of lens 174. The embodiment of FIG. 8 has a DC type response. Numerous other non-confocal arrangements could be shown and described. In addition, the principles of using multiple-section beam waveguides with active elements distributed as described above are also applicable to optical modulators such as that disclosed in FIG. 5 of the above-cited patent of R. Kompfner, e.g., to tilted mirror optical modulators.

The drive frequency for maximum deflection in the AC type embodiments, as defined above, is as follows:

$$f = \frac{c(1+2k)}{Nd} \quad (5)$$

$c$ = speed of light $k$ = integer, 0, 1, 2, 3 . . .

The drive frequency for the DC type of embodiment is as follows:

$$f = 2ck/Nd \quad (6)$$

$k$ = integer, 0, 1, 2, 3 . . .

if series connected as defined above. Most of the DC type embodiments can also be shunt connected for AC frequency response, per Equation 5 above.

The DC types actually have AC response of frequencies given by $K=1, 2, 3 \ldots$ in Equation 6 when series connected. Real DC response is only $K=0$ case of Equation 6. We include all embodiments capable of DC frequency response, when series connected, in our category of DC type embodiments.

A further modification of all the embodiments is that the output beam can be taken from around the right end reflector instead of around the mirror having the input aperture, typically by appropriate proportioning of the right-hand reflector in each case.

It will be emphasized that, in all of the embodiments of FIGS. 1–9, the deflection elements are relatively near the beam crossover points on the axis. These points are readily predicted and, therefore, expected. Extension of this principle of placement of the deflection elements leads to other embodiments.

We claim:

1. Apparatus for the deflection of a beam of polarized coherent light, comprising:
    a source of a signal at a frequency at which said beam is to be repetitively deflected, and
    a plurality of deflection means driven at a selected phase difference by said signal for producing a repetitive scan of said beam, including
    means for launching said beam in said apparatus, and
    a plurality of focusing elements forming a plurality of sections within said apparatus and producing guiding about an axis through said plurality of deflection means with a plurality of predictable crossovers of said axis by said beam,
    each one of said plurality of deflection means including a plurality of electro-optic crystals disposed in different ones of said sections substantially at said crossovers and oriented for cumulative deflection of said beam in one of said coordinates in said ones of said sections.

2. Apparatus according to claim 1 in which the launching means comprises means for admitting the beam with an initial propagation direction along said axis, said apparatus including reflective means for providing multiple passes of said beam through said plurality of deflection means.

3. Apparatus according to claim 1 in which the launching means comprises reflective means obliquely oriented with respect to said axis for admitting the beam with an initial propagation direction along said axis.

4. Apparatus according to claim 1 in which the launching means comprises apertured means for admitting the beam with an initial propagation direction along said axis.

5. Apparatus according to claim 1 including first and second reflectors opposed along said axis, the focusing elements being substantially confocally spaced, and the deflection elements are disposed at substantially odd confocal spacings from the second one of said reflectors to reflect said beam.

6. Apparatus according to claim 5 in which the reflectors are focusing reflectors and the focusing elements are all disposed at substantially confocal spacings from said focusing reflectors.

7. Apparatus according to claim 5 in which the reflectors are essentially planar reflectors and the focusing elements are disposed at odd half-confocal spacings from at least one of said reflectors.

8. Apparatus according to claim 2 in which the reflective means includes one curved reflector combining the functions of one of said focusing elements and said reflective means.

9. Apparatus according to claim 1 in which the focusing elements are disposed at spacings substantially different from confocal spacings.

10. Apparatus according to claim 2 in which the reflectvie means include at least one focusing reflector, there being no part of any of said deflection means between said focusing reflector and the nearest focusing element.

11. Apparatus according to claim 2 in which the launching means and reflective means includes at least one essentially planar reflector having a central aperture.

12. Apparatus according to claim 1 in which the launching means comprises oblique reflective means for launching the beam with an initial propagation direction along the axis.

13. Apparatus according to claim 12 in which the oblique reflective means is shaped to launch the beam by reflection.

14. Apparatus according to claim 2 in which the reflective means and the focusing elements include an element in common, the separation of said focusing elements being substantially greater than confocal, portions of said first and second deflection means being disposed between said focusing reflector and the nearest focusing element, said focusing reflector having a central aperture for admitting the beam.

15. Apparatus according to claim 14 in which the reflective means includes a substantially planar reflector opposed to said focusing reflector to provide the multiple passes of said beam, said planar reflector being separated from the nearest focusing element by half the spacing of said focusing reflector from its nearest focusing element.

References Cited

UNITED STATES PATENTS 3,515,455    6/1970    Kompfner ---------- 350—150

DAVID SCHONBERG, Primary Examiner

P. R. MILLER, Assistant Examiner

U.S. Cl. X.R.

350—96 WG, 157, 160, DIG. 2